(12) United States Patent
Chotoku et al.

(10) Patent No.: US 7,076,151 B2
(45) Date of Patent: Jul. 11, 2006

(54) IMAGE RECORDING APPARATUS AND METHOD, IMAGE PLAYBACK APPARATUS AND METHOD, AND RECORDING MEDIUM

(75) Inventors: Koichi Chotoku, Tokyo (JP); Takeshi Yamauchi, Chiba (JP); Takashi Karimoto, Kanagawa (JP); Kenji Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1387 days.

(21) Appl. No.: 09/804,494

(22) Filed: Mar. 12, 2001

(65) Prior Publication Data

US 2001/0035963 A1   Nov. 1, 2001

(30) Foreign Application Priority Data

Mar. 14, 2000   (JP) .............................. 2000-070148

(51) Int. Cl.
*H04N 5/91* (2006.01)
(52) U.S. Cl. .............................. 386/69; 386/68; 386/111
(58) Field of Classification Search ................... 386/6, 386/68, 69, 109, 111–112, 37, 23
See application file for complete search history.

(56) References Cited

U.S. PATENT DOCUMENTS 5,838,872 A * 11/1998 Kawara ....................... 386/68
6,973,126 B1 * 12/2005 Yoneyama et al. ......... 375/240

* cited by examiner

*Primary Examiner*—Robert Chevlaier
*Assistant Examiner*—Helen Shibru
(74) *Attorney, Agent, or Firm*—Oblon, Spivak, McClelland, Maier & Neustadt, P.C.

(57) ABSTRACT

An image recording and playback apparatus and method and a recording medium by which a representative picture of image data recorded on a hard disk can be searched out and displayed rapidly are disclosed. An inputted AV signal is recorded on a hard disk, and a comparison table produced based on GOP numbers of an inputted image signal and recorded positions on the hard disk at which the top data of GOPs of the GOP numbers is recorded is recorded on another hard disk. Another table produced based on GOP numbers of GOPs in each of which an intra-picture necessary to play back a corresponding representative picture is included and the distances between the intra-pictures and the corresponding representative pictures included in the GOPs of the GOP numbers is recorded on a further hard disk.

10 Claims, 6 Drawing Sheets

18

| n | I(n) | P(n) |
|---|---|---|
| ⋮ | ⋮ | ⋮ |
| 100 | 3 | 1500 |
| 101 | 3 | 1517 |
| 102 | 3 | 1530 |
| 103 | 3 | 1535 |
| 104 | 3 | 1540 |
| ⋮ | ⋮ | ⋮ |

FIG.4

| n | A(n) |
|---|---|
| ⋮ | ⋮ |
| 100 | 100000 |
| 101 | 100120 |
| 102 | 100200 |
| 103 | 100250 |
| 104 | 100330 |
| ⋮ | ⋮ |

FIG.5

| n | D(k) |
|---|---|
| ⋮ | ⋮ |
| 101 | 11 |
| 205 | 9 |
| 392 | 8 |
| ⋮ | ⋮ |

IMAGE RECORDING APPARATUS AND METHOD, IMAGE PLAYBACK APPARATUS AND METHOD, AND RECORDING MEDIUM

BACKGROUND OF THE INVENTION

This invention relates to an image recording and playback apparatus and method and a recording medium, and more particularly to an image recording and playback apparatus and method and a recording medium by which a representative picture to be used for specification of contents of moving pictures can be searched out and displayed.

In recent years, increase in capacity and reduction in cost of recording media such as a hard disk and increase in speed of processing of compression coding of a moving picture signal and a sound signal (hereinafter referred to collectively as AV signal) have been and are proceeding. Thus, electronic apparatus have been developed which make use of various techniques to compress and encode, record and then play back an AV signal of a television program.

An electronic apparatus of the type mentioned allows recording of a plurality of AV signals of different television programs onto a recording medium of a large capacity represented by a hard disk. Therefore, in order to make it possible for a user to manage a plurality of recorded AV signals of different programs readily, the electronic apparatus preferably has a function of extracting and recording a still picture (representative picture) from an image signal of a program being recorded.

For example, an electronic apparatus which has a function of producing and displaying a representative picture for each title (program) records time information such as a time stamp (recording hour) or a frame number of each frame onto a hard disk together with time information of the representative picture. Then, when an instruction to display a representative picture is issued from the user, the electronic apparatus accesses the hard disk to search for the representative picture from a time stamp recorded in advance on the hard disk and causes a monitor to display the representative picture. Consequently, the user can grasp contents of the title from the displayed representative picture or select a desired title or scene from among a plurality of titles.

However, in order for such an electronic apparatus as described above to search for a representative picture, a comparison table for contrast between time stamps and recorded positions (addresses) on the hard disk, that is, a table which is referred to to discriminate at which address of the hard disk a representative picture is recorded, must be produced.

Further, even if such a comparison table as described above is produced, the electronic apparatus cannot search out a desired representative picture rapidly.

SUMMARY OF THE INVENTION

It is an object of the present invention to provide an image recording and playback apparatus and method and a recording medium by which a representative picture of image data can be searched out and displayed rapidly.

In order to attain the object described above, according to the present invention, a GOP number of a GOP in which an intra-picture necessary to play back a representative picture which is used for specification of contents of moving pictures is included and a distance (offset) between the intra-picture included in the GOP number and the representative picture are recorded so that the representative picture can be searched out rapidly.

More particularly, according to an aspect of the present invention, there is provided an image recording apparatus, including first recording control means for controlling recording of an inputted image signal into a first recording region of a recording medium, fetching means for fetching a frame number of a representative picture of the image signal, first calculation means for calculating a GOP number of a GOP of the image signal which includes an intra-picture necessary to play back the representative picture based on the frame number fetched by the fetching means, second recording control means for controlling recording of recorded position information corresponding to a recorded position on the recording medium of the GOP of the GOP number calculated by the first calculation means into a second recording region of the recording medium, second calculation means for calculating an offset between the intra-picture and the representative picture in the GOP of the GOP number calculated by the first calculation means, and third recording control means for controlling recording of the offset calculated by the second calculation means into a third recording region of the recording medium.

The second recording control means may control recording of an address of a top frame of the GOP on the recording medium as the recorded position information corresponding to the recorded position on the recording medium of the GOP of the GOP number calculated by the first calculation means.

The second recording control means may control recording of an address of a top frame of the GOP on the recording medium and the number of the GOP as the recorded position information corresponding to the recorded position on the recording medium of the GOP of the GOP number calculated by the first calculation means.

The first calculation means may successively store the GOP number of each of GOPs of the inputted image signal, the position of the intra-picture of the GOP and the number of frames up to the GOP of the GOP number and make use of the stored information to calculate the GOP number of the GOP of the image signal which includes the intra-picture necessary to play back the representative picture.

According to another aspect of the present invention, there is provided an image recording method, including a first recording control step of controlling recording of an inputted image signal into a first recording region of a recording medium, a fetching step of fetching a frame number of a representative picture of the image signal, a first calculation step of calculating a GOP number of a GOP of the image signal which includes an intra-picture necessary to play back the representative picture based on the frame number fetched by the processing of the fetching step, a second recording control step of controlling recording of recorded position information corresponding to a recorded position on the recording medium of the GOP of the GOP number calculated by the processing of the first calculation step into a second recording region of the recording medium, a second calculation step of calculating an offset between the intra-picture and the representative picture in the GOP of the GOP number calculated by the processing of the first calculation step, and a third recording control step of controlling recording of the offset calculated by the processing of the second calculation step into a third recording region of the recording medium.

According to a further aspect of the present invention, there is provided a recording medium on which a computer-readable program is recorded, the program including a first recording control step of controlling recording of an inputted image signal into a first recording region of a recording medium, a fetching step of fetching a frame number of a representative picture of the image signal, a first calculation step of calculating a GOP number of a GOP of the image signal which includes an intra-picture necessary to play back the representative picture based on the frame number fetched by the processing of the fetching step, a second recording control step of controlling recording of recorded position information corresponding to a recorded position on the recording medium of the GOP of the GOP number calculated by the processing of the first calculation step into a second recording region of the recording medium, a second calculation step of calculating an offset between the intra-picture and the representative picture in the GOP of the GOP number calculated by the processing of the first calculation step, and a third recording control step of controlling recording of the offset calculated by the processing of the second calculation step into a third recording region of the recording medium.

With the image recording apparatus, the image recording method and the program recorded on the recording medium, recording of an inputted image signal into a first recording region of a recording medium is controlled, and a frame number of a representative picture of the image signal is fetched. Then, a GOP number of a GOP of the image signal which includes an intra-picture necessary to play back the representative picture is calculated based on the fetched frame number, and recording of recorded position information corresponding to a recorded position on the recording medium of the GOP of the calculated GOP number into a second recording region of the recording medium is controlled. Further, an offset between the intra-picture and the representative picture in the GOP of the calculated GOP number is calculated, and recording of the calculated offset into a third recording region of the recording medium is controlled. Consequently, the recorded position of the representative picture can be searched out rapidly.

According to a still further aspect of the present invention, there is provided an image playback apparatus, including first acquisition means for acquiring a recorded position on a recording medium at which, of an image signal recorded in a first recording region of the recording medium, a GOP in which an intra-picture necessary to play back a representative picture of the image signal is recorded from a second recording region of the recording medium, second acquisition means for acquiring an offset between the intra-picture and the representative picture in the GOP which includes the representative picture from a third recording region of the recording medium, readout control means for controlling reading out of the GOP of the first recording region of the recording medium in which the intra-picture necessary to play back the representative picture is included based on the recorded position acquired by the first acquisition means, and display control means for controlling displaying of the representative picture included in the image signal, whose reading out is controlled by the readout control means, based on the offset acquired by the second acquisition means.

The first acquisition means may acquire a recorded position on the recording medium at which a top frame of the GOP is recorded as the recorded position on the recording medium at which the GOP in which the intrapicture necessary to play back the representative picture is recorded.

According to a yet further aspect of the present invention, there is provided an image playback method, including a first acquisition step of acquiring a recorded position on a recording medium at which, of an image signal recorded in a first recording region of the recording medium, a GOP in which an intra-picture necessary to play back a representative picture of the image signal is recorded from a second recording region of the recording medium, a second acquisition step of acquiring an offset between the intra-picture and the representative picture in the GOP which includes the representative picture from a third recording region of the recording medium, a readout control step of controlling reading out of the GOP of the first recording region of the recording medium in which the intra-picture necessary to play back the representative picture is included based on the recorded position acquired by the processing of the first acquisition step, and a display control step of controlling displaying of the representative picture included in the image signal, whose reading out is controlled by the processing of the readout control step, based on the offset acquired by the processing of the second acquisition step.

According to a yet further aspect of the present invention, there is provided a recording medium on which a computer-readable program is recorded, the program including a first acquisition step of acquiring a recorded position on a recording medium at which, of an image signal recorded in a first recording region of the recording medium, a GOP in which an intra-picture necessary to play back a representative picture of the image signal is recorded from a second recording region of the recording medium, a second acquisition step of acquiring an offset between the intra-picture and the representative picture in the GOP which includes the representative picture from a third recording region of the recording medium, a readout control step of controlling reading out of the GOP of the first recording region of the recording medium in which the intra-picture necessary to play back the representative picture is included based on the recorded position acquired by the processing of the first acquisition step, and a display control step of controlling displaying of the representative picture included in the image signal, whose reading out is controlled by the processing of the readout control step, based on the offset acquired by the processing of the second acquisition step.

With the image playback apparatus, the image playback method and the program recorded on the second recording medium, a recorded position on a recording medium at which, of an image signal recorded in a first recording region of the recording medium, a GOP in which an intra-picture necessary to play back a representative picture of the image signal is recorded is acquired from a second recording region of the recording medium, and an offset between the intra-picture and the representative picture in the GOP which includes the representative picture is acquired from a third recording region of the recording medium. Then, reading out of the GOP of the first recording region of the recording medium in which the intra-picture necessary to play back the representative picture is included is controlled based on the acquired recorded position, and the representative picture included in the image signal, whose reading out is controlled, is displayed based on the acquired offset. As a result, the recorded position of the representative picture can be searched out and displayed rapidly.

The above and other objects, features and advantages of the present invention will become apparent from the following description and the appended claims, taken in conjunction with the accompanying drawings in which like parts or elements denoted by like reference symbols. dr

BRIEF DESCRIPTION OF THE DRAWINGS

FIG. 4 a diagrammatic view showing an example of another comparison table used in the hard disk drive of FIG. 1;

FIG. 5 is a diagrammatic view showing an example of a table used in the hard disk drive of FIG. 1;

DESCRIPTION OF THE PREFERRED EMBODIMENT

Figure 1:
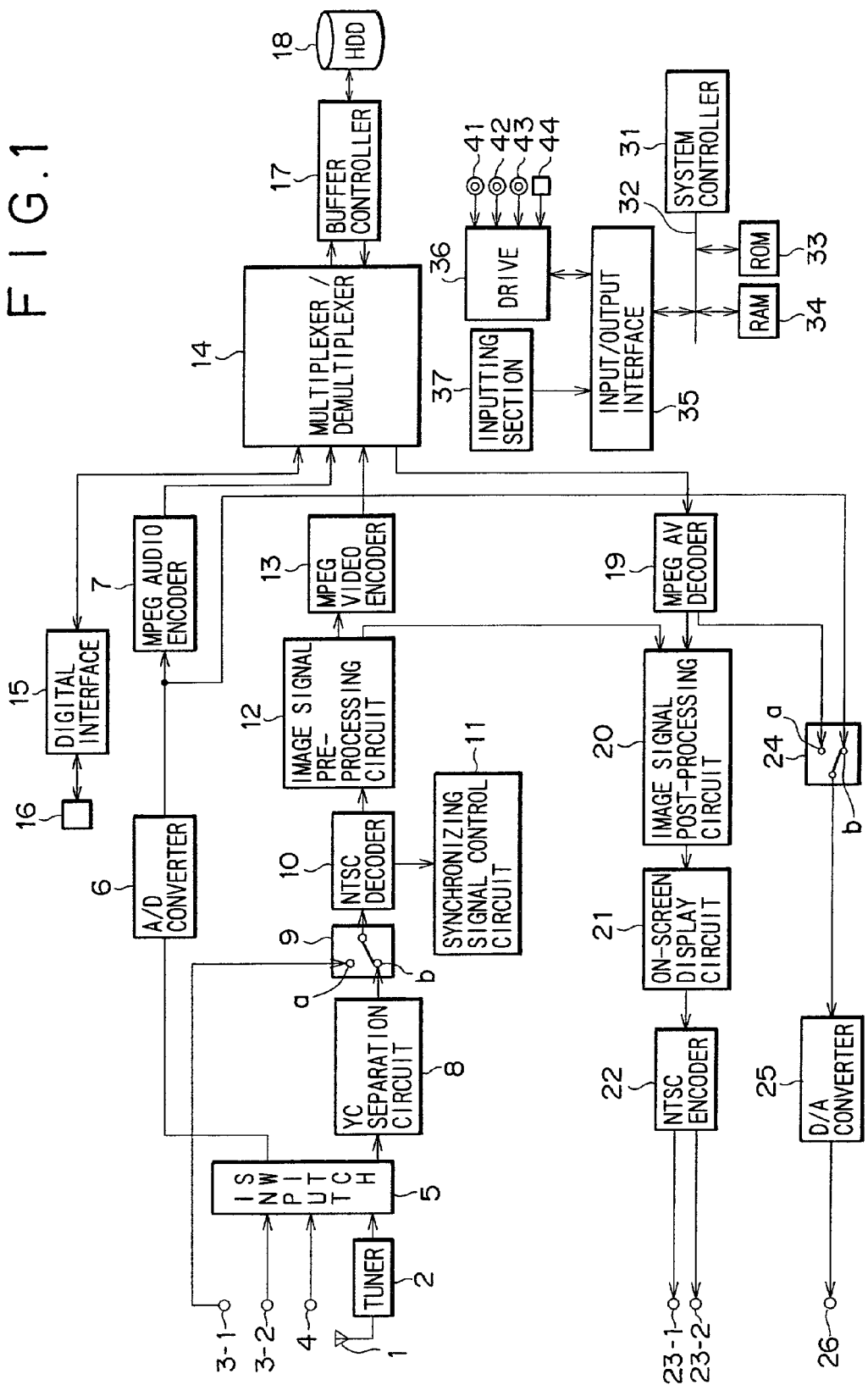
FIG. 1 is a block diagram showing an example of a construction of a hard disk recorder to which the present invention is applied.

Referring first to FIG. 1, there is shown an example of a construction of a hard disk recorder to which the present invention is applied. An antenna 1 receives television broadcasts and supplies the received signal to a tuner 2. The tuner 2 receives a signal of a program of a predetermined channel from within the received signals of radio waves from the antenna 1 in accordance with an instruction from a system controller 31, and supplies the received signal to an input switch 5.

An external apparatus not shown inputs an S image signal (a separate signal of a Y signal (brightness signal) and a C signal (color signal)) to a terminal a of a switch 9 through an external video input terminal 3-1. The external apparatus further inputs a composite image signal to the input switch 5 through another external video input terminal 3-2 and inputs a sound signal to the input switch 5 through an external audio input terminal 4.

The input switch 5 selects a desired one of an image signal and a sound signal inputted thereto in accordance with an instruction from the system controller 31. Thus, the input switch 5 outputs a composite image signal to a YC separation circuit 8 and outputs a sound signal to an A/D (Analog to Digital) converter 6.

The A/D converter 6 A/D converts the sound signal inputted thereto from the input switch 5 and supplies resulting digital audio data to an MPEG (Moving Picture Experts Group) audio encoder 7. The A/D converter 6 further supplies the sound data obtained by the A/D conversion to a terminal b of a switch 24. The MPEG audio encoder 7 compresses the sound data supplied thereto from the A/D converter 6 in accordance with the MPEG system to produce a sound elementary stream (ES) and supplies the sound elementary stream to a multiplexer/demultiplexer 14.

The YC separation circuit 8 separates the composite image signal inputted thereto from the input switch 5 into a brightness signal (Y signal) and a color signal (C signal) in accordance with an instruction from the system controller 31 and supplies the brightness signal and the color signal to a NTSC (National Television System Committee) decoder 10 through a terminal b of the switch 9. The switch 9 is switched in accordance with an instruction from the system controller 31 such that, when an S image signal from the external apparatus is to be supplied to the NTSC decoder 10, the terminal a is selected, but when the image separate signal from the YC separation circuit 8 is to be supplied to the NTSC decoder 10, the terminal b is selected.

The NTSC decoder 10 performs an A/D conversion process, a chroma encoding process and other necessary processes for the image signal inputted thereto through the switch 9 in accordance with an instruction from the system controller 31 to convert the image signal into a digital component video signal (hereinafter referred to as image data) and supplies the image data to an image signal pre-processing circuit 12. Further, the NTSC decoder 10 produces a clock signal based on a horizontal synchronizing signal of the image signal inputted thereto and supplies a horizontal synchronizing signal, a vertical synchronizing signal and a field discrimination signal obtained through synchronizing separation to a synchronizing signal control circuit 11.

The synchronizing signal control circuit 11 produces a clock signal and a synchronizing signal with reference to the horizontal synchronizing signal, vertical synchronizing signal and field discrimination signal supplied thereto from the NTSC decoder 10 in accordance with an instruction from the system controller 31 and supplies the produced clock signal and synchronizing signal to the pertaining components.

The image signal pre-processing circuit 12 performs image signal processing such as pre-filtering for the image data supplied thereto from the NTSC decoder 10 in accordance with an instruction from the system controller 31 and supplies resulting image data to an MPEG video encoder 13 and an image signal post-processing circuit 20. The MPEG video encoder 13 performs coding processing such as discrete cosine transform (DCT) for the image data supplied thereto from the image signal pre-processing circuit 12 in accordance with an instruction from the system controller 31 to produce an elementary stream of images and supplies the image elementary stream to the multiplexer/demultiplexer 14.

Upon recording, the multiplexer/demultiplexer 14 multiplexes an elementary stream of images, an elementary stream of sound and various control signals, which each is in an MPEG compressed form, in accordance with an instruction from the system controller 31 to produce a transport stream (TS), for example, of the MPEG system, and supplies the transport stream to a buffer controller 17. Upon playback, the multiplexer/demultiplexer 14 demultiplexes a transport stream of the MPEG system supplied thereto from the buffer controller 17 to extract a PES (Packetized Elementary Stream) from the transport stream and supplies the PES to an MPEG AV (Audio Video) decoder 19.

The buffer controller 17 controls in accordance with an instruction from the system controller 31 so that a transport stream supplied continuously from the multiplexer/demultiplexer 14 can be supplied intermittently to a hard disk drive (HDD) 18. Since writing of the transport stream cannot be performed during, for example, a seeking operation of the hard disk drive 18, the transport stream is temporarily stored into a buffer, and then when writing is enabled, the transport stream is written at a rate higher than the input rate thereof. Consequently, the transport stream which is inputted continuously is recorded without interruption by the hard disk drive 18.

The buffer controller 17 further controls the buffer so that a signal inputted intermittently thereto from the hard disk drive 18 may become a continuous signal and supplies a resulting continuous transport stream to the multiplexer/demultiplexer 14.

The hard disk drive 18 records a transport stream intermittently supplied thereto from the buffer controller 17 into a predetermined address in accordance with an instruction from the system controller 31. Further, the hard disk drive 18 seeks a predetermined address, reads out a transport stream recorded at the predetermined address and supplies the transport stream to the buffer controller 17.

The buffer controller 17 and the hard disk drive 18 use the IDE (Integrated Drive Electronics) as a protocol. However, any other protocol may be used only if it allows recording of a transport stream.

The MPEG AV decoder 19 separates a PES supplied thereto from the multiplexer/demultiplexer 14 into an elementary stream of images and another elementary stream of sound in accordance with an instruction from the system controller 31, performs predetermined decoding processing for the two elementary streams, and supplies resulting image data of a baseband to the image signal post-processing circuit 20 and resulting sound data of the baseband to the terminal a of the switch 24.

The image signal post-processing circuit 20 switches, synthesizes or filters an image signal supplied thereto from the image signal pre-processing circuit 12 and another image signal of the baseband supplied thereto from the MPEG AV decoder 19 in accordance with an instruction from the system controller 31, and supplies a resulting signal to an on-screen display (OSD) circuit 21. Further, the image signal post-processing circuit 20 produces a window (GUI: Graphic User Interface) for image display or a like window, produces a representative picture of the image data, applies the representative picture to the window, and supplies resulting data to the on-screen display circuit 21.

The on-screen display circuit 21 converts text information into corresponding image data in accordance with an instruction from the system controller 31, superposes the image data on image data supplied thereto from the image signal post-processing circuit 20, and supplies resulting image data to an NTSC encoder 22. The NTSC encoder 22 converts the image data (a component digital signal) supplied thereto from the on-screen display circuit 21 into a Y signal and a C signal, produces an S image signal through D/A conversion of the Y signal and the C signal and produces an analog composite image signal, and outputs the S image signal and the analog composite image signal to an external apparatus through a pair of external video output terminals 23-1 and 23-2, respectively, in accordance with an instruction from the system controller 31.

The switch 24 is switched in accordance with an instruction from the system controller 31 such that, when sound data of the baseband from the MPEG AV decoder 19 are to be supplied to a D/A converter 25, the terminal a is selected, but when sound data from the A/D converter 6 are to be supplied to the D/A converter 25, the terminal b is selected. The D/A converter 25 D/A converts the sound data inputted thereto through the switch 24 and outputs resulting analog sound data to the external apparatus through an external audio output terminal 26.

The system controller 31 reads out and executes a program stored in a ROM (Read Only Memory) 33 through a host bus 32 and controls the components of the hard disk recorder. A program or data necessary for the system controller 31 to control the components of the hard disk recorder is suitably stored into a RAM (Random Access Memory) 34. The system controller 31, ROM 33 and RAM 34 are connected to each other by the host bus 32 and connected also to an input/output interface 35. A drive 36 is connected to the input/output interface 35, and a magnetic disk 41, an optical disk 42, a magneto-optical disk 43 or a semiconductor memory 44 is removably loaded into the drive 36. Also an inputting section 37 including a keyboard, a mouse, buttons, switches, a remote commander and/or some other necessary inputting element is connected to the input/output interface 35.

The hard disk recorder can input and output not only an analog signal but also digital data. For example, an IRD (Integrated Receiver Decoder) not shown receives a transport stream from a digital input/output terminal 16 to a digital interface 15 through an IEEE (The Institute of Electrical and Electronics Engineers) 1394 serial bus. The digital interface 15 performs interface processing for the transport stream and supplies the inputted transport stream to the multiplexer/demultiplexer 14 in accordance with an instruction from the system controller 31. The multiplexer/demultiplexer 14 outputs the transport stream supplied thereto from the digital interface 15 to the buffer controller 17 in accordance with an instruction from the system controller 31.

Further, the multiplexer/demultiplexer 14 outputs a transport stream supplied thereto from the buffer controller 17 to the digital interface 15. The digital interface 15 supplies the transport stream inputted thereto from the buffer controller 17 to the external IRD through the IEEE 1394 serial bus from the digital input/output terminal 16 so that the transport stream may be outputted to and displayed on a monitor connected to the external IRD.

It is to be noted that, while it is described above that the hard disk recorder and the IRD are connected to each other, the present invention is not limited to this, and the hard disk recorder may be connected otherwise to a personal computer or a like apparatus.

Further, while it is described above that the image signal is compressed in accordance with the MPEG system, the present invention is not limited to this, and any other compression system may be used or the image signal may be used otherwise without being compressed.

Now, basic operation of the hard disk recorder described above with reference to FIG. 1 is described.

Upon recording, an AV signal of a television program received by the tuner 2 is supplied to the input switch 5. A composite signal selected by the input switch 5 is inputted to the YC separation circuit 8, and a sound signal is inputted to the A/D converter 6. The A/D converter 6 A/D converts the sound signal inputted thereto from the input switch 5 and supplies resulting digital sound data to the MPEG audio encoder 7. The MPEG audio encoder 7 compresses the sound data supplied thereto from the A/D converter 6 in accordance with the MPEG system to produce an elementary stream of sound and supplies the sound elementary stream to the multiplexer/demultiplexer 14.

The YC separation circuit 8 separates the composite image signal inputted thereto from the input switch 5 into a Y signal and a C signal and supplies the Y signal and the C signal to the NTSC decoder 10 through the terminal b of the switch 9. The NTSC decoder 10 performs an A/D conversion process, a chroma encoding process and other necessary processes for the image signal supplied thereto from the YC separation circuit 8 through the switch 9 to convert the image signal into image data and supplies the image data to the image signal pre-processing circuit 12. The image signal pre-processing circuit 12 performs image signal processing such as pre-filtering for the image data supplied thereto from the NTSC decoder 10 and supplies resulting image data to the MPEG video encoder 13. The MPEG video encoder 13 performs coding processing such as discrete cosine transform (encoding processing of the MPEG system) for the image data supplied thereto from the image signal pre-processing circuit 12 to produce an elementary stream of images, and supplies the image elementary stream to the multiplexer/demultiplexer 14.

The multiplexer/demultiplexer 14 multiplexes the image data and the sound data in an MPEG compressed form supplied thereto from the MPEG video encoder 13 and the MPEG audio encoder 7 to produce a transport stream and supplies the transport stream to the buffer controller 17. The buffer controller 17 supplies the transport stream supplied thereto from the multiplexer/demultiplexer 14 to the hard disk drive 18 so that the transport stream may be recorded onto a hard disk 51 (refer to FIG. 2).

At this time, the system controller 31 acquires information of a picture type (I, P or B picture) from the MPEG video encoder 13 and successively records a GOP (Group of Pictures) number n, the position (address) I(n) of an intra-picture (I picture) included in the GOP of the GOP number n and the picture number P(n) representative of the number of pictures generated before the GOP of the GOP number n is reached into a comparison table T1 (FIG. 3) of the RAM 34 (or otherwise onto the hard disk).

Further, the system controller 31 acquires, from information of the buffer controller 17, the recorded position (address) A(n) on the hard disk 51 of the hard d i s k drive 18 at which the top data of the GOP number n is recorded, produces a comparison table T2 (FIG. 4) for contrast between the recorded position A(n) and the GOP number n, and supplies the produced comparison table T2 to the hard disk drive 18 so that the comparison table T2 may be recorded onto another hard disk 52. Furthermore, if a representative picture is designated, then the system controller 31 calculates the GOP number n of a GOP necessary to produce the representative picture and a frame distance between (the position I(n)) of an intra-picture included in the GOP of the GOP number n and the representative picture and supplies the calculated GOP number and the frame distance to the hard disk drive 18 so that they may be recorded in a corresponding relationship to each other onto a further hard disk 53 (FIG. 5).

Upon playback, the multiplexer/demultiplexer 14 reads out a transport stream recorded in the hard disk drive 18 through the buffer controller 17, separates the transport stream into a video elementary stream and an audio elementary stream (PES) and supplies the video and audio elementary streams to the MPEG AV decoder 19. The MPEG AV decoder 19 decodes the video and audio elementary streams supplied thereto from the multiplexer/demultiplexer 14 in accordance with the MPEG system, and supplies resulting image data to the image signal post-processing circuit 20 and supplies resulting sound data to the D/A converter 25 through the terminal a of the switch 24.

The image signal post-processing circuit 20 produces a representative picture of the image data supplied thereto from the MPEG AV decoder 19, reduces and applies a plurality of such representative pictures to one window (multiple screens) (FIG. 8), and outputs the window to the on-screen display circuit 21. The on-screen display circuit 21 produces image data corresponding to text (character) information and so forth when necessary in accordance with an instruction from the system controller 31, superposes the produced image data on the image data of the window for display of the multiple screens supplied thereto from the image signal post-processing circuit 20, and outputs resulting image data to the NTSC encoder 22. The NTSC encoder 22 D/A converts the image data supplied thereto after it converts the image data into a Y signal and a C signal or directly without such conversion to produce an S image signal and an analog composite image signal, and supplies the S image signal and the analog composite image signal to individual external apparatus through the external video output terminals 23-1 and 23-2 so that the signals may be outputted to and displayed on monitors connected to the external apparatus, respectively.

If a user who refers to the table display (multiple screens) of the representative pictures displayed on any of the monitors determines a program to be played back and inputs an instruction to play back the program, then an AV signal corresponding to the program is selected from the image data read out from the hard disk drive 18 and played back.

Figures 2, 3:
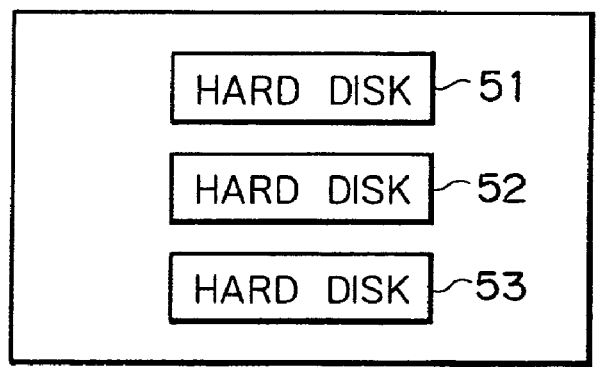
FIG. 2 is a block diagram showing a detailed construction of a hard disk drive of the hard disk drive of FIG. 1.
FIG. 3 is a diagrammatic view showing an example of a comparison table used in the hard disk drive of FIG. 1.

FIG. 2 illustrates recording regions of the hard disk drive 18. Referring to FIG. 2, the hard disk drive 18 includes the three hard disks 51 to 53 built therein. An AV signal inputted to the hard disk drive 18 is recorded on the hard disk 51, and the comparison table T2 (FIG. 4) is recorded on the hard disk 52 while a table T3 (FIG. 5) of GOP numbers n of GOPs in each of which an intra-picture necessary to play back a representative picture and the distances (offset numbers) between the intra-pictures included in the GOPs of the GOP numbers n and the respective representative pictures are recorded on the hard disk 53.

FIG. 3 illustrates an example of the comparison table T1 recorded in the RAM 34. The comparison table T1 includes the GOP numbers n, the positions I(n) of intra-pictures included in the GOPs of the GOP numbers, and picture numbers (frame numbers) P(n) generated before the GOP numbers n are reached.

In the example of FIG. 3, corresponding to the GOP number 100, data are recorded such that the position I(n) of an intra-picture is 3 (frames) and the picture number P(n) generated before the GOP number 100 is reached is 1,500 (frames) Corresponding to the GOP number 101, data are recorded such that the position I(n) of an intra-picture is 3 and the picture number P(n) generated before the GOP number 101 is reached is 1,517. Corresponding to the GOP number 102, data are recorded such that the position I(n) of an intra-picture is 3 and the picture number P(n) generated before the GOP number 102 is reached is 1,530. Corresponding to the GOP number 103, data are recorded such that the position I(n) of an intra-picture is 3 and the picture number P(n) generated before the GOP number 103 is reached is 1,535. Further, corresponding to the GOP number 104, data are recorded such that the position I(n) of an intra-picture is 3 and the picture number P(n) generated before the GOP number 104 is reached is 1,540.

FIG. 4 illustrates an example of the comparison table T2 recorded on the hard disk 52 built in the hard disk drive 18. The comparison table T2 includes the GOP numbers n and the recorded positions A(n) on the hard disk 51 of the hard disk drive 18 at which the top data of the GOP numbers n are recorded.

In the example of FIG. 4, corresponding to the GOP number 100, data is recorded such that the recorded position A(n) on the hard disk 51 at which the top data of the GOP number 100 is stored is 100,000. Corresponding to the GOP number 101, data is recorded such that the recorded position A(n) on the hard disk 51 at which the top data of the GOP number 101 is stored is 100,120. Corresponding to the GOP number 102, data is recorded such that the recorded position A(n) on the hard disk 51 at which the top data of the GOP number 102 is stored is 100,200. Corresponding to the GOP number 103, data is recorded such that the recorded position A(n) on the hard disk 51 at which the top data of the GOP number 103 is stored is 100,250. Further, corresponding to the GOP number 104, data is recorded such that the recorded position A(n) on the hard disk 51 at which the top data of the GOP number 104 is stored is 100,330.

FIG. 5 illustrates an example of the table T3 recorded on the hard disk 53 built in the hard disk drive 18. The table T3 includes the GOP numbers n, and the distances (offset numbers) D(k) between the intra-pictures included in the GOPs of the GOP numbers n and the respective representative pictures.

In the example of FIG. 5, corresponding to the GOP number 101, data is recorded such that the distance D(k) between the intra-picture included in the GOP of the GOP number 101 and the corresponding representative picture is 11 (frames). Corresponding to the GOP number 205, data is recorded such that the distance D(k) between the intra-picture included in the GOP of the GOP number 205 and the corresponding representative picture is 9. Further, corresponding to the GOP number 392, data is recorded such that the distance D(k) between the intra-picture included in the GOP of the GOP number 392 and the corresponding representative picture is 8.

Subsequently, a representative picture recording process executed by the system controller 31 is described with reference to a flow chart of FIG. 6. It is to be noted that the representative picture recording process is started when recording of an AV signal inputted to the hard disk recorder is started, and is executed parallelly to the recording processing.

In step S1, the system controller 31 discriminates whether or not recording of a program (AV signal) comes to an end. If it is discriminated that recording of the program does not come to an end, then the processing advances to step S2, in which the system controller 31 controls the multiplexer/demultiplexer 14 so that the image data are multiplexed and supplied as a transport stream to the hard disk drive 18 through the buffer controller 17 so as to be recorded onto the hard disk 51.

Further in step S2, the system controller 31 acquires information of picture types (I, P and B pictures) of the image data to be recorded from the MPEG video encoder 13 and successively records the GOP number n, the position I(n) of an intra-picture included in the GOP of the GOP number n, and the picture number (frame number) P(n) generated before the GOP number n is reached into the comparison table T1 (FIG. 3) of the RAM 34. Further, the system controller 31 acquires, from the information of the buffer controller 17, the recorded position (address) A(n) on the hard disk 51 of the hard disk drive 18 at which the top frame of the GOP number n is recorded, and records the recorded position A(n) into the comparison table T2 (FIG. 4) of the hard disk 52 of the hard disk drive 18 in a corresponding relationship to the GOP number n.

In step S3, the system controller 31 discriminates whether or not a request to record a representative picture is issued at a predetermined position of the program being recorded, that is, whether or not it is requested to add an index to a predetermined position of the program being recorded. If it is discriminated that a request to record a representative picture is not issued, then the processing returns to step S1 so that the processing described above is repeated.

On the other hand, if it is discriminated in step S3 that it is requested to record a representative picture, then the processing advances to step S4, in which the system controller 31 acquires, from the information of the MPEG video encoder 13, the recording frame number (picture number) k which represents what numbered frame from the start of recording (first frame) the image data (frame) designated by the user is.

Then in step S5, the system controller 31 accesses the RAM 34 through the host bus 32 to read out the comparison table T1 recorded by the processing in step S2 and substitutes the recording frame number k acquired by the processing in step S4 into the following expression (1) to calculate the GOP number n which satisfies the expression (1):

$$P(n)+I(n)<=k<P(n+1)+I(n+1) \quad (1)$$

Then in step S6, the system controller 31 substitutes the GOP number n acquired by the processing in step S5, the position I(n) of an intra-picture corresponding to the GOP number n determined from the comparison table T1 and the picture number P(n) generated before the GOP number n is reached into the following expression (2) to calculate the distance D(k) between the designated representative picture (picture number k) and the intra-picture I(n):

$$D(k)=k-P(n)-I(n) \quad (2)$$

In step S7, the system controller 31 supplies the GOP number n acquired by the processing in step S5 and the distance (offset number) D(k) between the representative picture and the intra-picture calculated by the processing in step S6 to the hard disk drive 18 through the host bus 32 and the buffer controller 17 so as to be recorded onto the hard disk 53 (FIG. 5). Thereafter, the processing returns to step S1. Consequently, the processing beginning with step S2 is repeated until it is discriminated in step S1 that recording of the program comes to an end.

It is to be noted that, while, in the foregoing description, a representative picture is designated by a user, the present invention is not limited to this, and for example, a representative picture may be designated automatically by the system controller 31 such that, for example, when a characteristic point such as a scene changing point is detected, a frame (the top of the new scene) immediately following the characteristic point is designated as a representative picture.

Subsequently, a representative picture displaying process executed by the system controller 31 is described with reference to a flow chart of FIG. 7. This process is started when an instruction to display a representative picture is issued by a user through the inputting section 37.

In step S21, the system controller 31 refers to the table T3 (FIG. 5) of the hard disk 53 to discriminate whether or not there still remains a representative picture to be displayed. If it is discriminated that there still remains a representative picture to be displayed, then the system controller 31 acquires the GOP number n in which the representative picture to be displayed is included and the distance (offset number) D(k) of the GOP of the GOP number n to the corresponding intra-picture from the table T3 in steps S22 and S23, respectively. Then in step S24, the system controller 31 accesses the hard disk 52 of the hard disk drive 18 to read out the comparison table T2 (FIG. 4) to acquire the recorded position A(n) on the hard disk 51 of the hard disk drive 18 at which the top frame of the GOP number n acquired by the processing in step S22 is recorded.

In step S25, the system controller 31 accesses the hard disk 51 of the hard disk drive 18 based on the recorded position A(n) on the hard disk 51 of the hard disk drive 18 acquired by the processing in step S24 to search for a place (address) at which the intra-picture of the GOP number n in which the representative picture to be displayed is included is recorded, and controls the hard disk drive 18 to play back the representative picture.

In step S26, the system controller 31 controls the multiplexer/demultiplexer 14 to demultiplex a transport stream read out from the recorded position A(n) on the hard disk 51 of the hard disk drive 18 searched out by the processing in step S25, extract a PES from the transport stream and supply the PES to the MPEG AV decoder 19. Then, the system controller 31 controls the MPEG AV decoder 19 to decode the number of frames (pictures) equal to the offset number D(k) acquired by the processing in step S23 from the intra-picture from within the PES supplied from the multiplexer/demultiplexer 14 to produce image data of the baseband of the last D(k)th frame (representative picture) and supply the produced image data of the baseband to the image signal post-processing circuit 20.

In step S27, the system controller 31 controls the image signal post-processing circuit 20 to reduce the size of the image data (representative picture) supplied from the MPEG AV decoder 19, that is, to produce a thumbnail image, apply the thumbnail image to a predetermined position of the window and supply the window to the on-screen display circuit 21. The on-screen display circuit 21 produces image data of a text and so forth to be displayed in a superposed relationship on the multi-screen supplied from the image signal post-processing circuit 20 and outputs resulting data to the NTSC encoder 22. The NTSC encoder 22 D/A converts the image data supplied thereto after it converts the image data into a Y signal and a C signal or directly without such conversion to produce an S image signal and an analog composite image signal and supplies the S image signal and the analog composite image signal individually to the external apparatus through the external video output terminals 23-1 and 23-2 so that the S image signal and the analog composite image signal may be outputted to and displayed on the monitors connected to the external apparatus. Thereafter, the processing returns to step S21.

Figure 8:
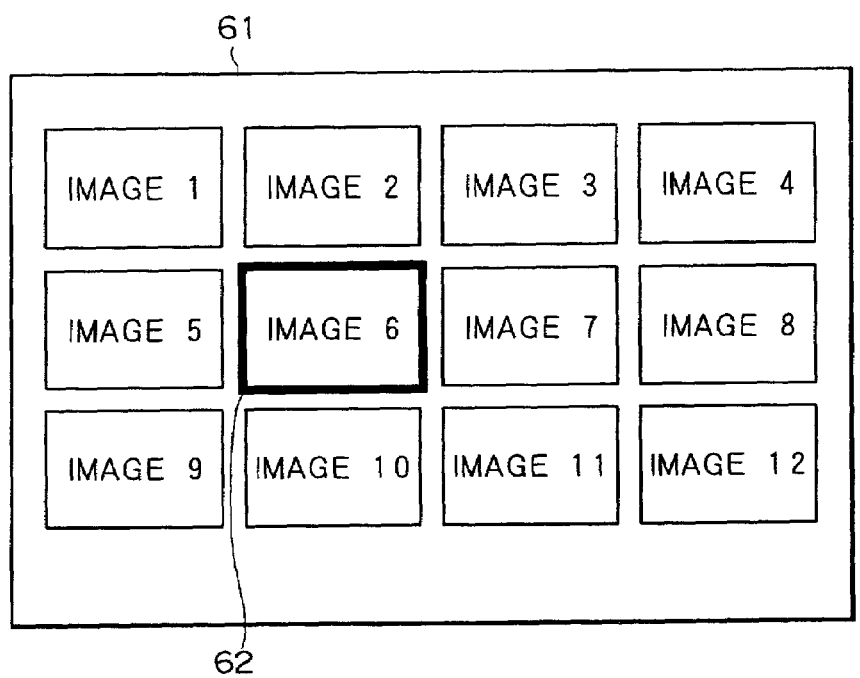
FIG. 8 is a schematic view showing an example of a display of multi-windows.

Consequently, as the processing in steps S21 to S27 described above is repeated, a plurality of thumbnail images of different representative pictures are applied to one window (a multi-screen is produced) and, for example, such a multi-window 61 (a table of representative pictures) as shown in FIG. 8 is displayed on the monitor.

If it is discriminated in step S21 that there remains no representative picture to be displayed any more, that is, if it is discriminated that all representative pictures are displayed, then the processing advances to step S28. In step S28, the system controller 31 discriminates whether or not the inputting section 37 is operated to select a representative picture to be played back by the user who refers to the multi-window 61 (FIG. 8) displayed on the monitor, that is, whether or not a selection execution command is inputted by the user using the keyboard of the inputting section 37 with a cursor 62 positioned at a predetermined position (on the multi-screen shown in FIG. 8, the image 6) using the mouse of the inputting section 37. If it is discriminated that a representative picture is not selected by the user as yet, then the system controller 31 waits until it becomes discriminated in step S28 that a representative picture is selected.

Then, when it is discriminated in step S28 that a representative picture is selected by the user, the system controller 31 reads out the table T3 (FIG. 5) of the hard disk 53 to acquire the GOP number n of a GOP in which the representative picture (in the present case, the image 6) selected by the processing in step S28 is included and the distance (offset number) D(k) of the GOP of the GOP number n to the corresponding intra-picture in steps S29 and 30, respectively. Then in step S31, the system controller 31 accesses the hard disk 52 of the hard disk drive 18 to read out the comparison table T2 (FIG. 4) to acquire the recorded position A(n) on the hard disk 51 of the hard disk drive 18 at which the top frame of the GOP number n acquired by the processing in step S29 is recorded.

In step S32, the system controller 31 accesses the hard disk 51 of the hard disk drive 18 based on the recorded position A(n) on the hard disk 51 of the hard disk drive 18 acquired by the processing in step S31 to search for a place (address) in which the intra-picture of the GOP of the GOP number n in which the selected representative picture (in the present case, the image 6) is included is recorded so that the intra-picture is played back by the hard disk drive 18.

In step S33, the system controller 31 controls the multiplexer/demultiplexer 14 to demultiplex a transport stream read out from the recorded position A(n) on the hard disk 51 of the hard disk drive 18 searched out by the processing in step S32, extract a PES from the transport stream and supply the PES to the MPEG AV decoder 19. Then, the system controller 31 controls the MPEG AV decoder 19 to decode a number of frames equal to the offset number D(k) acquired by the processing in step S30 from the intra-picture from within the PES supplied thereto from the multiplexer/demultiplexer 14 to produce image data and sound data of the baseband of the last D(k)th frame (representative picture), supply the produced image data of the baseband to the image signal post-processing circuit 20 and supply the produced sound data of the base band to the D/A converter 25 of the terminal a of the switch 24.

In step S34, the system controller 31 controls the image signal post-processing circuit 20 to perform image signal processing such as filter processing for the image data supplied from the MPEG AV decoder 19 and supply resulting image data to the on-screen display circuit 21. The on-screen display circuit 21 converts the text information into corresponding image data when necessary, superposes the produced image data on the image data supplied thereto from the image signal post-processing circuit 20 and outputs resulting data to the NTSC encoder 22. The NTSC encoder 22 D/A converts the image data supplied thereto from the on-screen display circuit 21 after it converts the image data into a Y signal and a C signal or directly without such conversion to produce an S image signal and an analog composite image signal and outputs the S image signal and the analog composite image signal individually to the external apparatus through the external video output terminals 23-1 and 23-2. Further, the system controller 31 controls the D/A converter 25 to D/A convert the sound data supplied from the MPEG AV decoder 19 and output resulting analog sound data to the external apparatus through the external audio output terminal 26.

Figure 9:
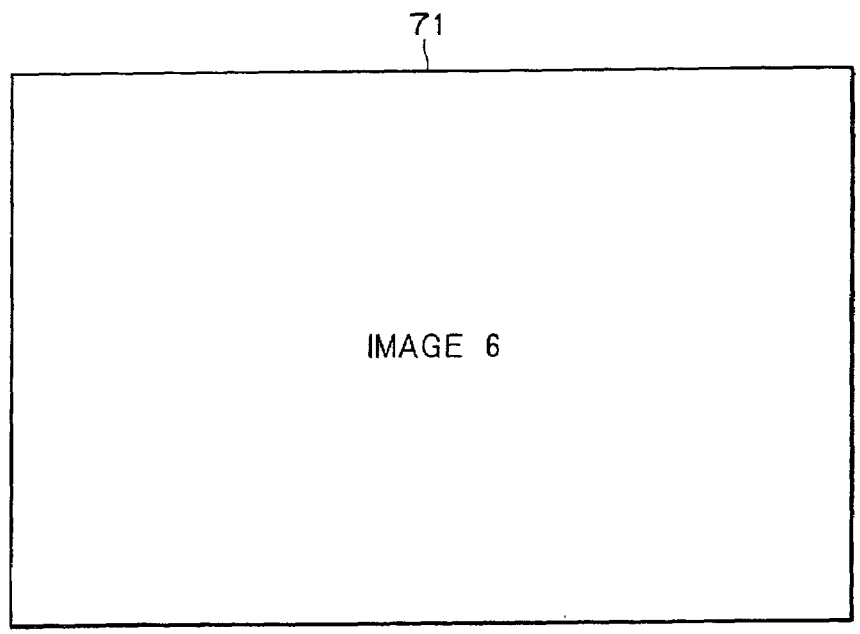
FIG. 9 is a schematic view showing an example of a display of a window.

In this manner, the external apparatus outputs the image of the representative picture selected by the user to the monitor connected thereto so that the image is displayed. Consequently, an image of the representative picture (in the present case, the image 6) is played back on such a window 71 as shown in FIG. 9), and images succeeding to the image of the representative picture are successively played back.

Subsequently, the representative picture recording process is described in more detail in connection with a concrete example. It is assumed that the comparison table T1 (FIG. 3) and the comparison table T2 (FIG. 4) are prepared already through the processing described above.

For example, when a user intends, during recording of a program, to store a picture being currently displayed as an index (representative picture), the user will operate the inputting section 37 to input a command to request for recording of a representative picture.

Figure 6:
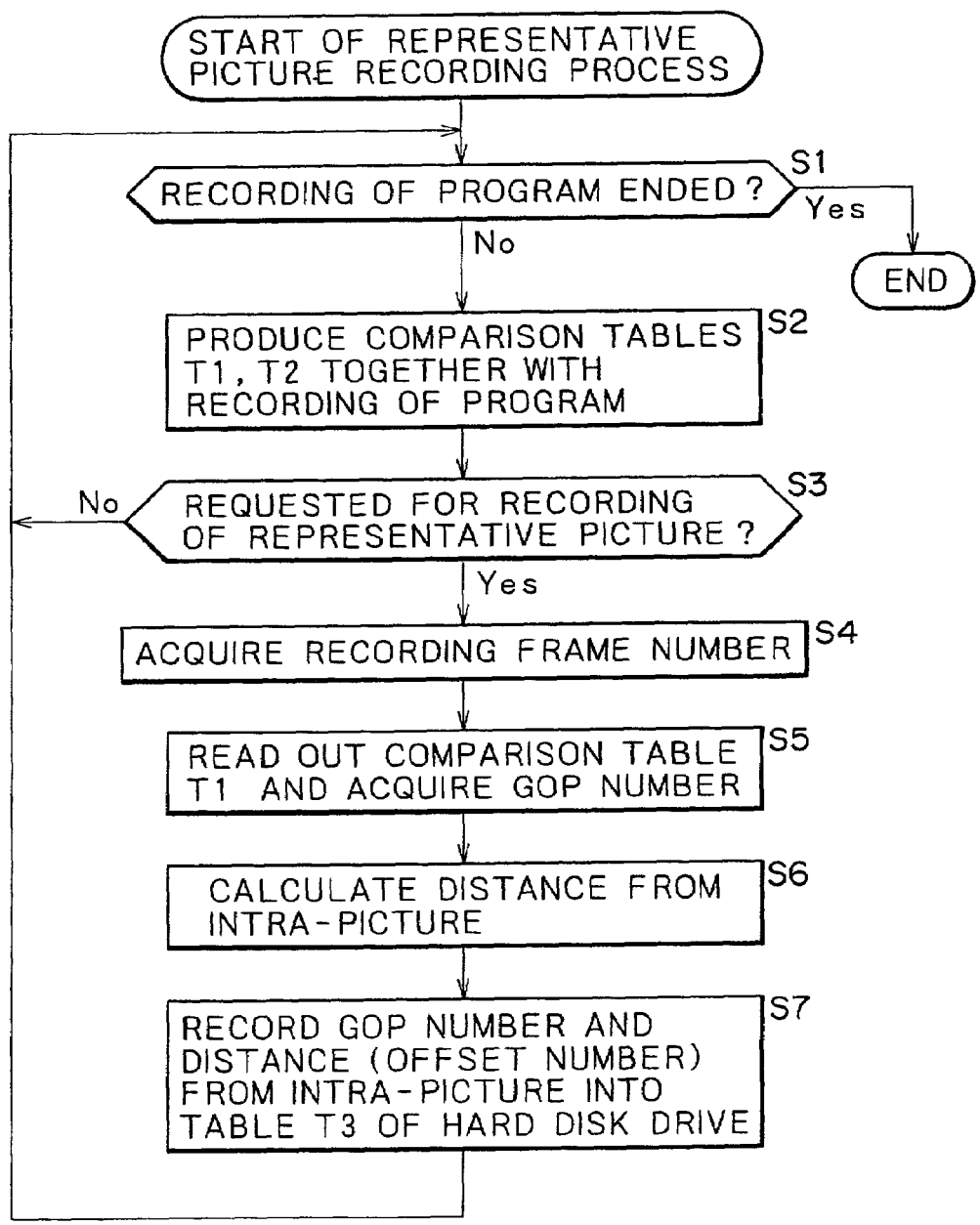
FIG. 6 is a flow chart illustrating a representative picture recording process of the hard disk drive of FIG. 1.

Thus, the system controller 31 discriminates in step S3 of the flow chart of FIG. 6 that a request for recording of a representative picture is issued at a predetermined position of a program being recorded by the user, and advances the processing to step S4. In step S4, the system controller 31 acquires the recording frame number k which represents what numbered frame from the start of recording (first frame) the image data (frame) of the program at the predetermined position according to the request by the user is. It is assumed that, for example, the recording frame number k=1531 is acquired.

In step S5, the system controller 31 accesses the RAM 34 through the host bus 32 to read out the comparison table T1 (refer to FIG. 3), substitutes the recording frame number k (in the present case, k=1,531) acquired by the processing in step S4 into the expression (1) to determine the GOP number n which satisfies the expression (1), and reads the position I(n) of an intra-picture included in the GOP of the GOP number n and the picture number P(n) produced before the GOP of the GOP number n is reached from the comparison table T1.

$$P(101)+I(101)=1520<=(k=)1531<1533=P(102)+2 \quad (1)$$
$$(102)$$

From the expression (1), the GOP number n=101 is determined. Further, from the comparison table T1, the position I(102)=3 of the intra-picture included in the GOP of the GOP number 101 and the picture number P(101)=1,517 generated before the GOP of the GOP number 101 is reached are acquired.

In step S6, the system controller 31 substitutes the GOP number n (in the present case, n=101) acquired by the processing in step S5, the position I(n) (in the present case, I(101)=3) of the intra-picture included in the GOP of the GOP number n and the picture number P(n) (in the present case, P(101)=1,517) generated before the GOP of the GOP number n is reached into the expression (2) to calculate the distance (offset number) D(k) between the desired representative picture and the intra-picture I(n):

$$D(1,531)=k-P(101)-I(101)=1,531-1,517-3=11 \quad (2)$$

As a result of the arithmetic operation of the expression (2) above, the offset number D(k)=11 is acquired.

In step S7, the system controller 31 controls the hard disk drive 18 to record the GOP number n (in the present case, n=101) acquired by the processing in step S5 and the offset number D(k) (in the present case, D(1,531)=11) from the intra-picture calculated by the processing in step S6 into the table T3 (FIG. 5) of the hard disk 53.

In this manner, upon recording, the GOP number n of a representative picture (frame) designated by a user and the offset number D(k) between the representative picture and a corresponding intra-picture are recorded onto the hard disk 53 of the hard disk drive 18. Therefore, it is not necessary to manage representative pictures based on time information such as a time stamp or a frame number. The processing of searching for (specifying) the recorded position of a representative picture from the GOP number n and the offset number D(k) can be performed at a higher speed than the processing of searching for the recorded position of a representative picture from time information.

The displaying process of representative pictures recorded by the processing described above is described in more detail with reference to the flow chart of FIG. 7.

For example, if a user who refers to the multi-window 61 (FIG. 8) displayed on the monitor intends to play back a predetermined representative picture, then the user will select the desired representative picture. It is assumed that, for example, a representative picture of the recording frame number k=1,531 (in the example of FIG. 8, the image 6) is selected.

Figure 7:
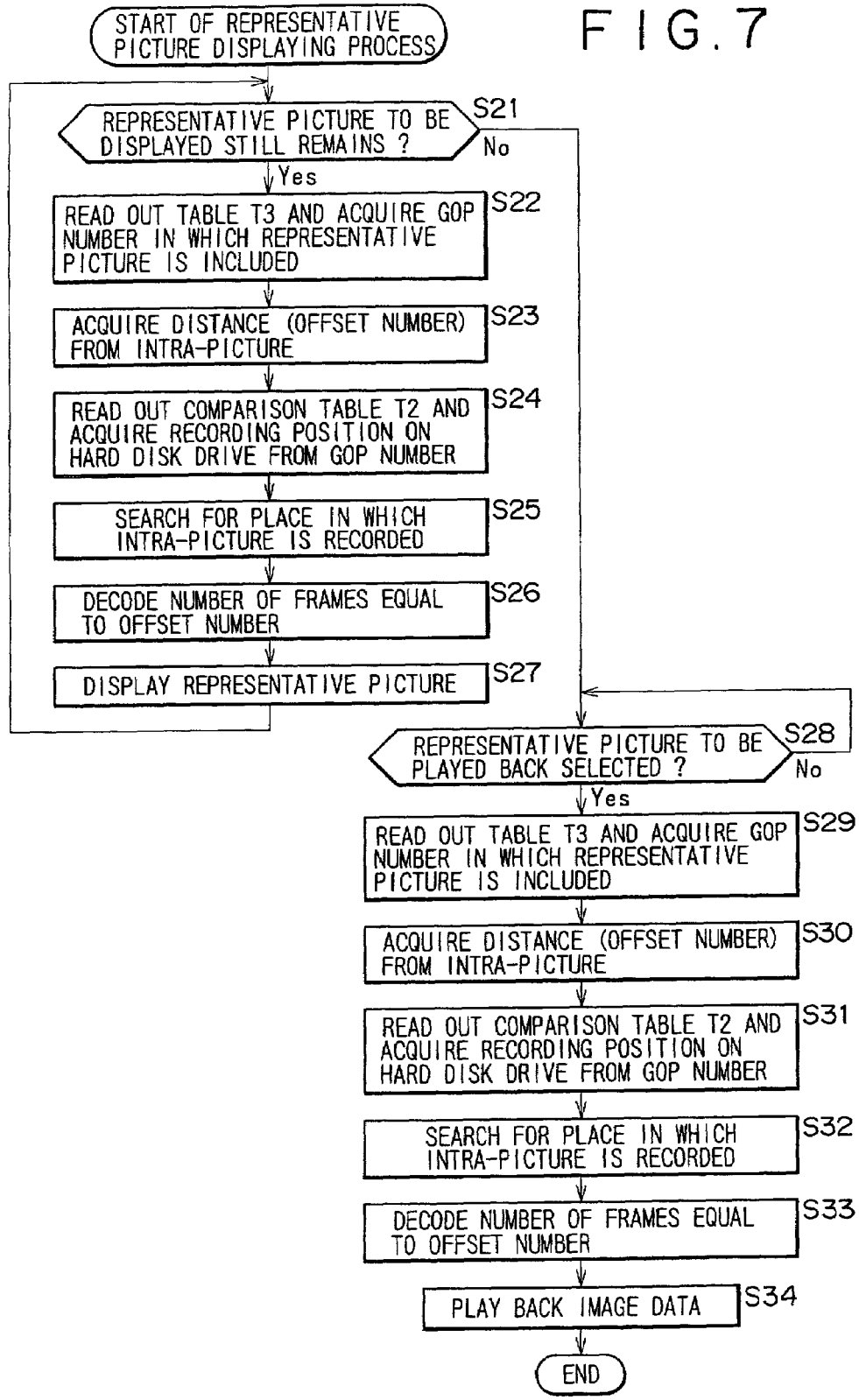
FIG. 7 is a flow chart illustrating a representative picture displaying process of the hard disk drive of FIG. 1.

Consequently, the system controller 31 discriminates in step S28 of the flow chart of FIG. 7 that a representative picture to be played back is selected by the user, and advances the processing to step S29. In step S29, the system controller 31 reads out the table T3 (FIG. 5) to acquire the GOP number n (in the present case, n=101) in which the representative picture (in the present case, the recording frame number k=1,531) selected by the processing in step S28 is included. Then, in step S29, the system controller 31 acquires the distance (offset number) D(k) (in the present case, the number D(1,531)=11) to a corresponding intra-picture.

In step S31, the system controller 31 accesses the hard disk 52 of the hard disk drive 18 to read out the comparison table T2 (FIG. 4) to acquire the recorded position A(n) (in the present case, A(101)=10,200) on the hard disk 51 of the hard disk drive 18 at which the top frame of the GOP number n (in the present case n=101) acquired by the processing in step S29 is recorded.

In step S32, the system controller 31 accesses the hard disk 51 of the hard disk drive 18 based on the recorded position A(n) (in the present case, A(101)=1,200) on the hard disk 51 of the hard disk drive 18 acquired by the processing in step S31 to search for a place (address) at which an intra-picture of the GOP number n of the GOP in which the selected representative picture (in the present case, the image of the recording frame number k=1,531) is included is recorded so that the intra-picture is played back by the hard disk drive 18.

In step S33, the system controller 31 controls the multiplexer/demultiplexer 14 to demultiplex a transport stream read out from the recorded position A(n) (in the present case, A(1,531)=10,200) on the hard disk 51 of the hard disk drive 18 searched out by the processing in step S32, extract a PES from the transport stream and supply the PES to the MPEG AV decoder 19. Then, the system controller 31 controls the MPEG AV decoder 19 to decode a number of frames equal to the offset number D(k) (in the present case, D(1,531)=11) acquired by the processing in step S30 from the intra-picture from within the PES supplied thereto from the multiplexer/demultiplexer 14 to produce image data and sound data of the baseband of the last eleventh frame, supply the produced image data of the baseband to the image signal post-processing circuit 20 and supply the produced sound data of the base band to the D/A converter 25 of the terminal a of the switch 24.

In step S34, the system controller 31 controls the image signal post-processing circuit 20 to perform image signal processing such as filter processing for the image data supplied from the MPEG AV decoder 19 and supply resulting image data to the on-screen display circuit 21. The on-screen display circuit 21 converts text information into corresponding image data when necessary, superposes the produced image data on the image data supplied thereto from the image signal post-processing circuit 20 and outputs resulting data to the NTSC encoder 22. The NTSC encoder 22 D/A converts the image data supplied thereto from the on-screen display circuit 21 after it converts the image data into a Y signal and a C signal or directly without such conversion to produce an S image signal and an analog composite image signal and outputs the S image signal and the analog composite image signal individually to the external apparatus through the external video output terminals 23-1 and 23-2. Further, the system controller 31 controls the D/A converter 25 to D/A convert the sound data supplied from the MPEG AV decoder 19 and output resulting analog sound data to the external apparatus through the external audio output terminal 26.

In this manner, upon playback, the GOP numbers n of representative pictures and the offset numbers D(k) between the representative pictures and corresponding intra-pictures recorded on the hard disk 53 of the hard disk drive 18 are read out. Thus, from the GOP numbers n and the offset numbers D(k), a recorded position of a desired representative picture can be searched out and played back in a short time.

While it is described above that the GOP numbers n in which representative pictures are included and the offset numbers D(k) of the representative pictures from corresponding intra-pictures are recorded on the hard disk 53 of the hard disk drive 18, the present invention is not limited to this, and it is otherwise possible to record the recorded positions A(n) (or the positions of the intra-pictures) on the hard disk 51 of the hard disk drive 18 in place of the GOP numbers n. In this instance, since the comparison table T2 described hereinabove need not be referred to, the processing speed can be further augmented. Further, since the recording region (hard disk 52) for recording the comparison table T2 is not required, the recording region (51) for an AV signal can be increased.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is formed as a package medium such as, as shown in FIG. 1, a magnetic disk 41 (including a floppy disk), an optical disk 42 (including a CD-ROM (Compact Disk-Read Only Memory) and a DVD (Digital Versatile Disk)), a magneto-optical disk 43 (including an MD (Mini-Disk)), or a semiconductor memory 44 which has the program recorded temporarily or permanently thereon or therein and is distributed in order to provide the program to a user, or as a ROM 33 which has the program recorded therein and is provided to a user in a form wherein it is incorporated in a computer or else as a hard disk included in a hard disk drive 18.

Further, in the present specification, the steps which describe the program recorded in or on a recording medium may be but need not necessarily be processed in a time series in the order as described, and include processes which are executed parallelly or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. An image recording apparatus, comprising:
    first recording control means for controlling recording of an inputted image signal into a first recording region of a recording medium;
    fetching means for fetching a frame number of a representative picture of the image signal;
    first calculation means for calculating a GOP number of a GOP of the image signal which includes an intra-picture necessary to play back the representative picture based on the frame number fetched by said fetching means;
    second recording control means for controlling recording of recorded position information corresponding to a recorded position on the recording medium of the GOP of the GOP number calculated by said first calculation means into a second recording region of the recording medium;
    second calculation means for calculating an offset between the intra-picture and the representative picture in the GOP of the GOP number calculated by said first calculation means; and
    third recording control means for controlling recording of the offset calculated by said second calculation means into a third recording region of the recording medium.

2. An image recording apparatus according to claim 1, wherein said second recording control means controls recording of an address of a top frame of the GOP on the recording medium as the recorded position information corresponding to the recorded position on the recording medium of the GOP of the GOP number calculated by said first calculation means.

3. An image recording apparatus according to claim 1, wherein said second recording control means controls recording of an address of a top frame of the GOP on the recording medium and the number of the GOP as the recorded position information corresponding to the recorded position on the recording medium of the GOP of the GOP number calculated by said first calculation means.

4. An image recording apparatus according to claim 1, wherein said first calculation means successively stores the GOP number of each of GOPs of the inputted image signal, the position of the intra-picture of the GOP and the number of frames up to the GOP of the GOP number and makes use of the stored information to calculate the GOP number of the GOP of the image signal which includes the intra-picture necessary to play back the representative picture.

5. An image recording method, comprising:
    a first recording control step of controlling recording of an inputted image signal into a first recording region of a recording medium;
    a fetching step of fetching a frame number of a representative picture of the image signal;
    a first calculation step of calculating a GOP number of a GOP of the image signal which includes an intra-picture necessary to play back the representative picture based on the frame number fetched by the processing of the fetching step;
    a second recording control step of controlling recording of recorded position information corresponding to a recorded position on the recording medium of the GOP of the GOP number calculated by the processing of the first calculation step into a second recording region of the recording medium;
    a second calculation step of calculating an offset between the intra-picture and the representative picture in the GOP of the GOP number calculated by the processing of the first calculation step; and
    a third recording control step of controlling recording of the offset calculated by the processing of the second calculation step into a third recording region of the recording medium.

6. A recording medium on which a computer-readable program is recorded, the program comprising:

a first recording control step of controlling recording of an inputted image signal into a first recording region of a recording medium;

a fetching step of fetching a frame number of a representative picture of the image signal;

a first calculation step of calculating a GOP number of a GOP of the image signal which includes an intra-picture necessary to play back the representative picture based on the frame number fetched by the processing of the fetching step;

a second recording control step of controlling recording of recorded position information corresponding to a recorded position on the recording medium of the GOP of the GOP number calculated by the processing of the first calculation step into a second recording region of the recording medium;

a second calculation step of calculating an offset between the intra-picture and the representative picture in the GOP of the GOP number calculated by the processing of the first calculation step; and a third recording control step of controlling recording of the offset calculated by the processing of the second calculation step into a third recording region of the recording medium.

7. An image playback apparatus, comprising:

first acquisition means for acquiring a recorded position on a recording medium at which, of an image signal recorded in a first recording region of the recording medium, a GOP in which an intra-picture necessary to play back a representative picture of the image signal is recorded from a second recording region of the recording medium;

second acquisition means for acquiring an offset between the intra-picture and the representative picture in the GOP which includes the representative picture from a third recording region of the recording medium;

readout control means for controlling reading out of the GOP of the first recording region of the recording medium in which the intra-picture necessary to play back the representative picture is included based on the recorded position acquired by said first acquisition means; and display control means for controlling displaying of the representative picture included in the image signal, whose reading out is controlled by said readout control means, based on the offset acquired by said second acquisition means.

8. An image playback apparatus according to claim 7, wherein said first acquisition means acquires a recorded position on the recording medium at which a top frame of the GOP is recorded as the recorded position on the recording medium at which the GOP in which the intrapicture necessary to play back the representative picture is recorded.

9. An image playback method, comprising:

a first acquisition step of acquiring a recorded position on a recording medium at which, of an image signal recorded in a first recording region of the recording medium, a GOP in which an intra-picture necessary to play back a representative picture of the image signal is recorded from a second recording region of the recording medium;

a second acquisition step of acquiring an offset between the intra-picture and the representative picture in the GOP which includes the representative picture from a third recording region of the recording medium;

a readout control step of controlling reading out of the GOP of the first recording region of the recording medium in which the intra-picture necessary to play back the representative picture is included based on the recorded position acquired by the processing of the first acquisition step; and a display control step of controlling displaying of the representative picture included in the image signal, whose reading out is controlled by the processing of the readout control step, based on the offset acquired by the processing of the second acquisition step.

10. A recording medium on which a computer-readable program is recorded, the program comprising:

a first acquisition step of acquiring a recorded position on a recording medium at which, of an image signal recorded in a first recording region of the recording medium, a GOP in which an intra-picture necessary to play back a representative picture of the image signal is recorded from a second recording region of the recording medium;

a second acquisition step of acquiring an offset between the intra-picture and the representative picture in the GOP which includes the representative picture from a third recording region of the recording medium;

a readout control step of controlling reading out of the GOP of the first recording region of the recording medium in which the intra-picture necessary to play back the representative picture is included based on the recorded position acquired by the processing of the first acquisition step; and a display control step of controlling displaying of the representative picture included in the image signal, whose reading out is controlled by the processing of the readout control step, based on the offset acquired by the processing of the second acquisition step.

* * * * *